3,103,405
NOVEL METHOD OF ERADICATING CERTAIN COLORS
Chester Davis, 415 E. 5th St., Newport, Ky.
No Drawing. Filed Sept. 7, 1960, Ser. No. 54,334
14 Claims. (Cl. 8—102)

This invention relates to a novel method of eradicating certain colors and is a continuation in part of my co-pending application, "Colored Hydrogen Bridge Complexes and Their Use," Serial No. 731,133, filed April 28, 1958, now abandoned.

The common recording fluids used in duplicating and recording systems utilize dyes or pigments which are in general strongly staining for clothing, paper, carpeting, and other surfaces. The method presently used for removing the dyes present in recording fluids from fiber surfaces is to use special ink eradicators which customarily contain strong oxidizing agents. In fact, many of these eradicators have an oxidizing agent of such strength that it is necessary to provide a second neutralizing fluid to remove the excess ink eradictor. These oxidizing agents, when used on colored fabrics, invariably bleach the color from the fabric in addition to removing the staining pigment and can deleterously affect many fibers by inducing in them some chemical change. Even the so-called "nonstaining" colors which are used in beverages and candies are difficult to remove from porous fibers. Like the staining inks, these "nonstaining" colors eventually form chemical combinations with surfaces with which they come in contact.

It is an object of this invention to provide a novel method of eradicating a certain class of pigments from different types of surfaces and fibrous materials, including glass, paper, plastics, cottons, woolens, and the like. This class of colors has previously been found useful as inks in recording systems. It is also an object of this invention to provide a novel method of reverse printing employing the above color-eradicating system. Still another object of this invention is to provide a novel means of transparentizing colored films on colorless supports. Further objects of this invention will become apparent from the following specification.

In my co-pending application, Serial No. 54,352 filed September 7, 1960, there are disclosed numerous highly colored nonstaining dye complexes comprising a colorless or weakly colored dye base and a crystalline organic phenol. These dye complexes are known generically as hydrogen bridge complexes and are prepared by dissolving the crystalline phenol and the dye base to give a colorless or weakly colored solution in a polar organic solvent. Upon removal of the polar organic solvent from a surface coated with this solution, a highly colored hydrogen bridge complex remains on the surface. The dye bases employed in general have logarithmic dissociation constants below 6.5.

This invention provides a method for eradicating the above highly colored hydrogen bridge complexes from any surface by contacting them with a polar organic solvent containing nitrogen, oxygen, or sulfur in one or more of the following groupings: alcohol, ketone, ester, aldehyde, nitro, amide, substituted amide, amine, sulfoxide, etc. Exemplary of the polar organic solvents which are useful for eradicating highly colored hydrogen bridge complexes formed from a weak dye base and a crystalline phenol are the following: methanol, ethanol, isopropanol, butanol, acetone, methylethylketone, methylisobutylketone, dioxane, pyridine, dimethylformamide, dimethylsulfoxide, ethyl acetate, methyl salicylate, methyl butyrate, tributyl phosphate, trioctyl phosphate, dibutyl phthalate, dioctyl phthalate, and the like. A class of solvents which are particularly useful for the purposes of this invention are the group known as the plasticizers or plasticizing fluids, in particular those which are useful as plasticizers for vinyl resins. Exemplary of this preferred group of solvents are tributyl phosphate, tri-(2-ethylhexyl) phosphate, dibutyl phthalate, dioctyl phthalate, tributyl citrate, dioctyl adipate, dioctyl azelate, tricresyl phosphate, and the like. The action of the above polar organic solvents in dissolving and dissociating highly colored hydrogen bridge complexes is quite surprizing and makes possible the eradication of these hydrogen bridge complexes from a variety of surfaces. These surfaces include those prepared from fibers of both animal and vegetable origin as well as the newer synthetic fibers and plastics. Thus the processes of my invention are useful for removing the highly colored hydrogen bridge complexes from human skin, wool, cotton, rayon, clothing or rugs, tile surfaces, glass, paper, plastics, and similar surfaces where they have spilled accidentally.

The processes of my invention also make possible the erasure of printed material in which a hydrogen bridge complex was used as the printing medium. Erasure of such printed indicia employing a hydrogen bridge complex, as ink from a paper surface, is complete and does not chemically alter the paper in any way. Thus, the erased area can be reemployed for printing. It is also possible utilizing the processes of this invention by reverse printing to make reverse master sheets ("negatives") by completely coating glass, cellophane, or similar transparent surfaces with a highly colored hydrogen bridge complex. A typewriter ribbon, copy paper, rubber stamp or marking stylus saturated with a nonvolatile polar organic solvent of the class described above is used; and the stamp or type can thus prepare a window in the colored master sheet, said window corresponding to a printed letter, a drawing or the like. Light can pass through such a window to fall on a photosensitive surface from which a mat ("positive") can be prepared.

A further use of the process of my invention is in the printing of white or weakly colored patterns on a textile surface by coating said surface with a colored hydrogen bridge complex and then forming the pattern by printing with an eradicating fluid containing a nonvolatile solvent such as trioctyl phosphate. Various other applications of the processes of this invention will be immediately apparent to those skilled in the art.

It is apparent that either volatile or nonvolatile polar organic solvents of the class described above can be used alone or in mixtures as the eradicating fluid when it is desired to eradicate a spilled ink formed from a colored hydrogen bridge complex from a fiber surface. However, when reverse printing is the use for which the solvent is needed, only the less volatile solvents will obviously be useful since acetone, ethanol, or the more volatile solvents would rapidly evaporate from a stamp pad or typewriter ribbon. Thus, for most purposes, the higher boiling, less volatile organic polar solvents such as the abovementioned vinyl resin plasticizers are more useful and are preferred. Furthermore, even if a volatile solvent were used in reverse printing, it would be necessary to remove the solution of the constituents of the hydrogen bridge complex in the volatile solvent from the area being erased since, were it not removed, the colored hydrogen bridge complex would again result upon evaporation of the volatile solvent.

DESCRIPTION

The invention is further illustrated by the following specific examples:

*Example I*

REMOVAL OF INK STAINS FROM COTTON SHIRTING

A patterned fabric broadcloth cotton shirting was sprayed with an ethanolic solution of Michler's Hydrol Diethylbenzenesulfinate (as disclosed in my co-pending application, Serial No. 800,377, filed March 19, 1959) and phenolphthalein. Bright blue spots of the colored hydrogen bridge complex of Michler's Hydrol Diethylbenzenesulfinate and phenolphthalein appeared on the shirt upon the evaporation of the ethanol. The stained areas were swabbed with trioctyl phosphate; the stains disappeared immediately. After remaining overnight the shirt was washed in a standard detergent solution to remove the excess trioctyl phosphate. The clean shirt showed no residual ink color, no fading of the patterned fabric, and no deleterious effect upon the fiber.

A white cotton shirting was sprayed with a dioxane solution of N-phenyl rhodamine B lactam and dihydroxydiphenylsulfone. Upon evaporation of the solvent, magenta-colored spots of the hydrogen bridge complex of N-phenyl rhodamine B lactam and dihydroxydiphenylsulfone appeared on the white shirt. The stained areas were swabbed with dioctyl phthalate, and the stain disappeared. The shirt was washed in a standard detergent solution to remove the excess dioctyl phthalate. The clean shirt showed no residual ink color and no yellowing of the white fabric.

*Example II*
REVERSE PRINTING

A solution of 2,2'-dinitro-4,4',4''-tris (dimethylamino)-triphenylcarbinol (dinitro crystal violet base) and dihydroxydiphenylsulfone in acetone was coated onto bond paper. A deep blue-black coating comprising the hydrogen bridge complex of the dye base and the phenol resulted upon evaporation of the acetone. A stylus using a mixture of equal amounts of dioxane and sucrose tetraacetate as the writing fluid was used to form letters on the surface. The letters formed a light yellow color on a blue-black background.

A solution of Michler's Hydrol Xylenesulfinate (as disclosed in my co-pending application, Serial No. 800,377, filed March 19, 1959) and pyrogallol in ethyl acetate was coated onto white cotton fabric. An intense blue coating comprising the hydrogen bridge complex of the Michler's Hydrol Xylenesulfinate and the phenol resulted upon evaporation of the ethyl acetate. A wood printing block inked with a mixture of methyl salicylate and dioctyl adipate was used to form a design on the cotton fabric surface. The design formed a colorless print on a blue background.

*Example III*
PREPARATION OF REVERSE MASTER

A dioxane solution of N-phenyl rhodamine B lactam and phenolphthalein was applied to a cellophane film. A deep magenta coating of the hydrogen bridge complex of N-phenyl rhodamine B lactam and the phenol resulted upon evaporation of the dioxane. A stylus employing tri (2-ethylhexyl) phosphate as the recording fluid was used to form letters on the coated cellophane sheet. A transparent window (a transparentized area of the colored film on the colorless support) corresponding to the written letters resulted.

A similar reverse master was made using an acetone solution of N-phenyl rhodamine B lactam, Michler's Hydrol Diethylbenzenesulfinate, and dihydroxydiphenylsulfone as the recording fluid. A deep violet film resulted upon evaporation of the acetone, said film being a mixed hydrogen bridge complex of the lactam and the diethylbenzenesulfinate with the phenol. A rubber stamp inked with dioctyl phthalate was used to form printed designs on the cellophane sheet. A transparent window corresponding to the printed design resulted.

An ethyl acetate solution of Michler's Hydrol and dihydroxydiphenylsulfone was applied to a transparent glass plate. An intense blue-violet coating of the hydrogen bridge complex of the dye base and the phenol resulted upon evaporation of the ethyl acetate from the glass surface. A mimeograph cut stencil was placed over the coating, and the whole sprayed with a mixture of equal parts of tributyl phosphate and trioctyl phosphate. A transparent window corresponding to the cut stencil resulted.

*Example IV*
PREVENTION OF COLOR FORMATION

A sheet of bond paper was printed with a design formed by dimethyl phthalate. The sheet was immediately sprayed with an acetone solution of dinitro crystal violet base and dihydroxydiphenylsulfone. Evaporation of the acetone yielded an intense blue-black color save on the areas coated by the polar fluid. The sheet was then immersed in benzene to remove the dimethyl phthalate. Evaporation of the benzene yielded a sheet with a white design on a blue-black background. This could be treated with a benzene solution of an oil-soluble dye, such as Sudan Red, to give a red-on-black pattern.

It should be clearly understood that the invention is not limited to the examples cited but is generally applicable to the prevention of color formation or eradication of colors formed by weak dye bases having a logarithmic dissociation constants below 6.5 and a hydrogen bridge forming compound. The eradicators and inhibitors of the present discovery are specific in their action and cannot be used on conventional inks, such as iron-logwood inks, Victoria Blue inks, or carbon black inks.

Having described my invention, I claim:

1. The method of erasure which comprises decoloration of an intensely colored pigment formed from an arylmethane color base characterized by a logarithmic dissociation constant below 6.5 and a crystalline organic phenol by contact with a polar organic solvent, said solvent characterized by the presence of at least one polar functional group selected from the class consisting of carbinol, carbonyl, amino, ester, acetal, sulfoxide, and nitro.

2. The method of claim 1 wherein the polar organic solvent characterized by the presence of at least one polar functional group selected from the class consisting of carbinol, carbonyl, amino, ester, acetal, sulfoxide, and nitro is a member of the group of low-volatile polar solvents having a flash point over 300 degrees Fahrenheit.

3. The method of erasure which comprises dissociation of an intensely colored pigment formed from an arylmethane color base having a logarithmic dissociation constant below 6.5 and a crystalline organic phenol into its components upon contact with a polar organic solvent, said solvent characterized by the presence of at least one polar functional group selected from the class consisting of carbinol, carbonyl, amino, ester, acetal, sulfoxide, and nitro.

4. The method of erasure which comprises decoloration of an intensely colored complex formed from an arylmethane color base having a logarithmic dissociation constant below 6.5 and a crystalline proton-donor by dissociation into its components upon contact with a polar organic solvent, said solvent characterized by the presence of at least one polar functional group selected from the class consisting of carbinol, carbonyl, amino, ester, acetal, sulfoxide, and nitro.

5. The method of reverse printing which comprises coating a receptive surface with an intensely colored pigment formed from an arylmethane color base having a logarithmic dissociation constant below 6.5 and a crystalline organic phenol and then printing on said surface with a polar organic solvent having a flash point over 300 degrees Fahrenheit, said solvent characterized by the presence of at least one polar functional group selected from the class consisting of carbinol, carbonyl, amino, ester, acetal, sulfoxide, and nitro.

6. The method of transparentizing colored films on colorless supports as a means of transmitting radiation through selective areas of the colored film which comprises coating a transparent surface with an intensely colored complex formed from an arylmethane color base having a logarithmic dissociation constant below 6.5 and a crystalline proton-donor, then contacting said coating with a polar organic solvent, said solvent characterized by the presence of at least one polar functional group selected from the class consisting of carbinol, carbonyl, amino, ester, acetal, sulfoxide, and nitro.

7. The method of transparentizing colored films on colorless supports as a means of transmitting radiation through selective areas of the colored film which comprises coating a transparent surface with an intensely colored complex formed from an arylmethane color base having a logarithmic dissociation constant below 6.5 and a crystalline organic phenol, then contacting said coating with a polar organic solvent, said solvent characterized by the presence of at least one polar functional group selected from the class consisting of carbinol, carbonyl, amino, ester, acetal, sulfoxide, and nitro.

8. The method of claim 7 wherein the polar organic solvent characterized by the presence of at least one polar functional group selected from the class consisting of carbinol, carbonyl, amino, ester, acetal, sulfoxide, and nitro is a member of the group consisting of low-volatile polar solvents having a flash point over 300 degrees Fahrenheit.

9. The method of inhibiting the formation of an intensely colored pigment of an arylmethane color base having a logarithmic dissociation constant below 6.5 and a crystalline organic phenol which comprises incorporating into a system of its components a polar organic compound characterized by the presence of at least one polar functional group selected from the class consisting of carbinol, carbonyl, amino, ester, acetal, sulfoxide, and nitro.

10. The method of inhibiting the formation of an intensely color complex of an arylmethane color base having a logarithmic dissociation constant below 6.5 and a crystalline proton-donor which comprises incorporating into a system of its components a polar organic compound characterized by the presence of at least one polar functional group selected from the class consisting of carbinol, carbonyl, amino, ester, acetal, sulfoxide, and nitro.

11. The method of decolorizing an intensely colored pigment formed from an arylmethane color base characterized by a logarithmic dissociation constant below 6.5 and a crystalline organic phenol which comprises contacting said pigment with a polar organic solvent characterized by the presence of an ester group and a flash point over 300 degrees Fahrenheit.

12. The method of decolorizing an intensely colored pigment formed from an arylmethane color base characterized by a logarithmic dissociation constant below 6.5 and a crystalline organic phenol which comprises contacting said pigment with a polar organic solvent characterized by the presence of a carbonyl group and a flash point over 300 degrees Fahrenheit.

13. The method of decolorizing an intensely colored pigment formed from an arylmethane color base characterized by a logarithmic dissociation constant below 6.5 and a crystalline organic phenol which comprises contacting said pigment with a polar organic solvent characterized by the presence of a carbinol group and a flash point over 300 degrees Fahrenheit.

14. The method of decolorizing an intensely colored pigment formed from an arylmethane color base characterized by a logarithmic dissociation constant below 6.5 and a crystalline organic phenol which comprises contacting said pigment with a polar organic compound characterized by the presence of an amino group and a flash point over 300 degrees Fahrenheit.

References Cited in the file of this patent

UNITED STATES PATENTS

| | | |
|---|---|---|
| 1,839,819 | Whitehead | Jan. 5, 1932 |
| 2,669,503 | Steinhardt | Feb. 16, 1954 |
| 2,927,040 | Davis | Mar. 1, 1960 |

OTHER REFERENCES

Du Pont Technical Bulletin, vol. 7, No. 1, March 1951, pp. 11-12.

American Dyestuff Reporter, November 26, 1951, pp. 765-766.